June 3, 1930.   E. P. JONES   1,761,444
AIRCRAFT CONSTRUCTION
Filed June 6, 1929   4 Sheets-Sheet 1
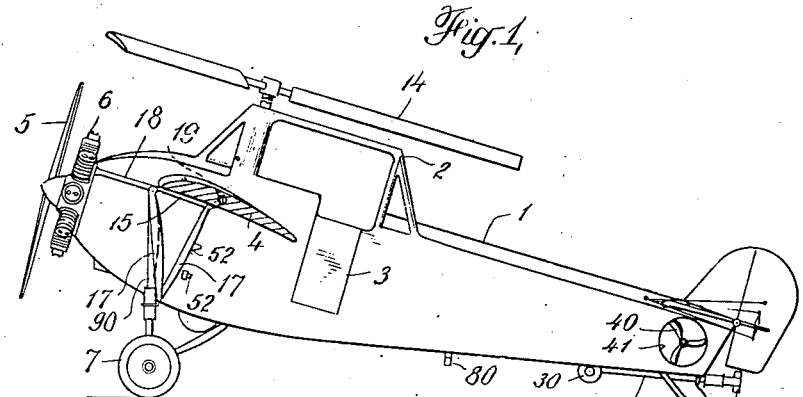
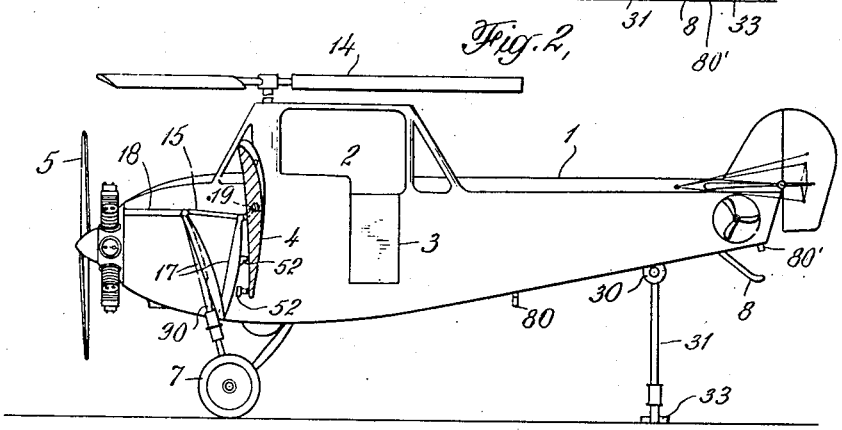
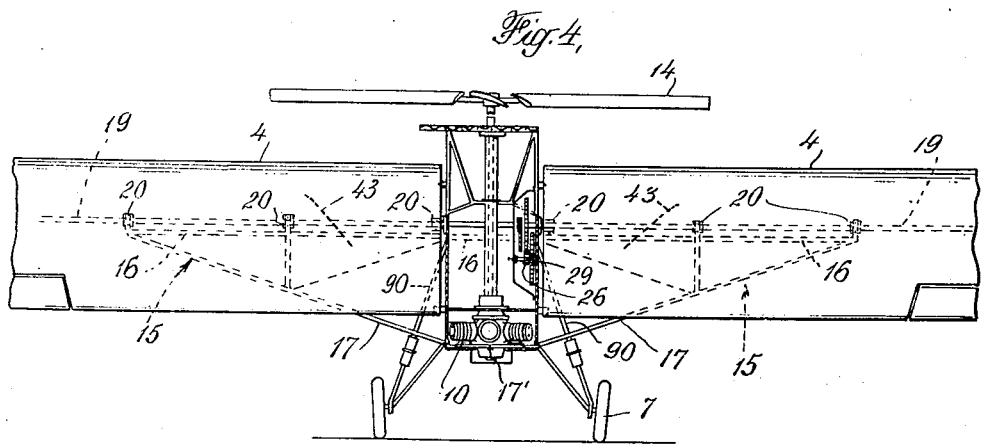
INVENTOR
Edward Powis Jones,
BY
Pennie, Davis, Marvin & Edmonds,
his ATTORNEYS

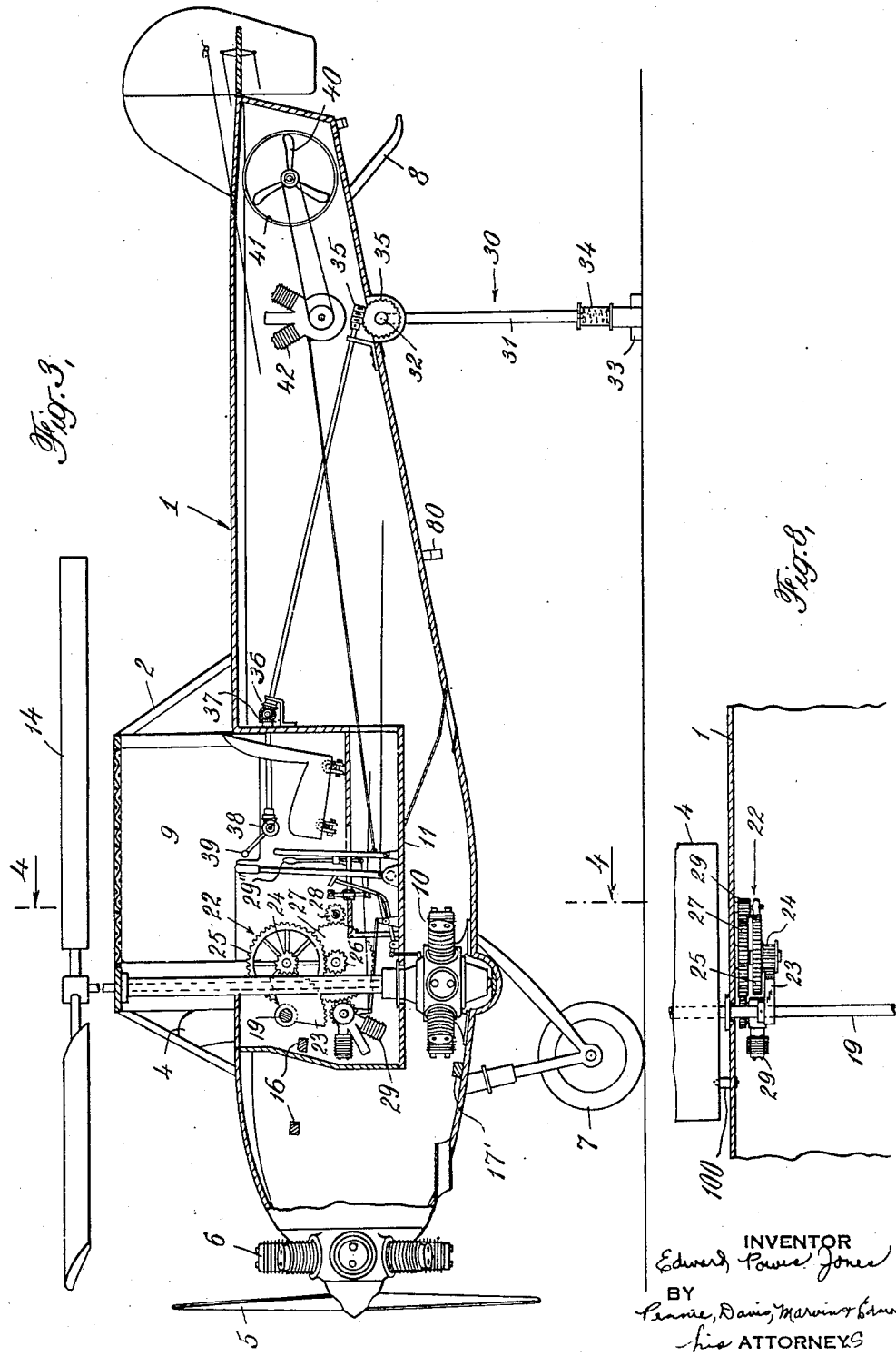

June 3, 1930. E. P. JONES 1,761,444
AIRCRAFT CONSTRUCTION
Filed June 6, 1929 4 Sheets-Sheet 3
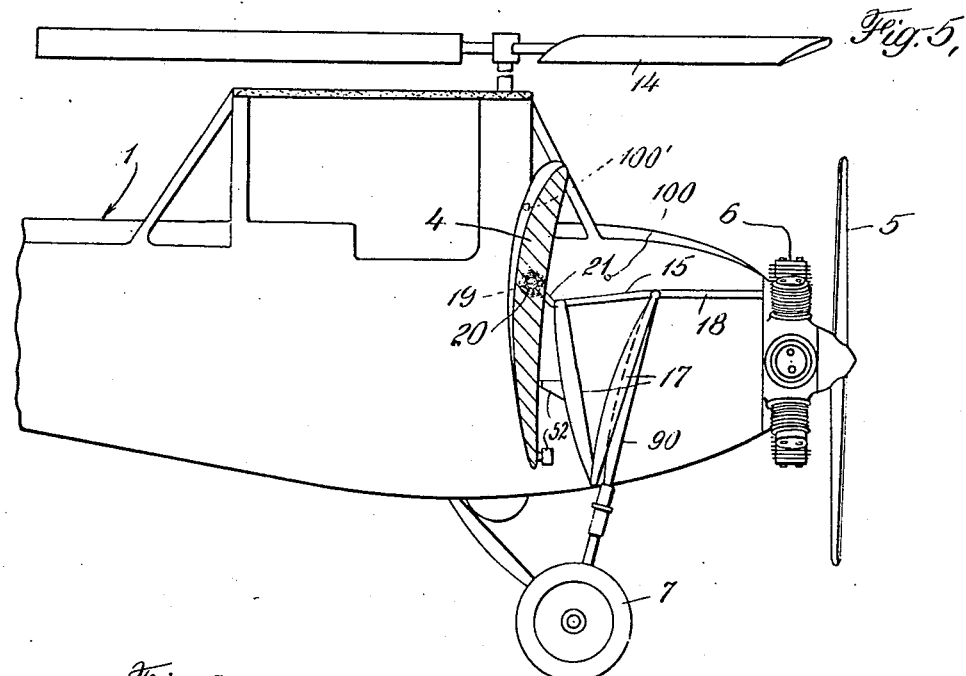
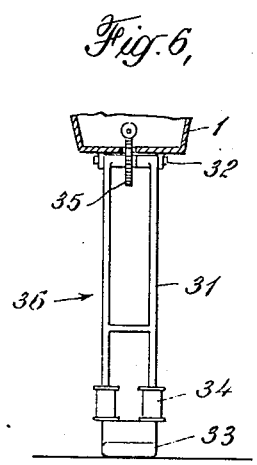
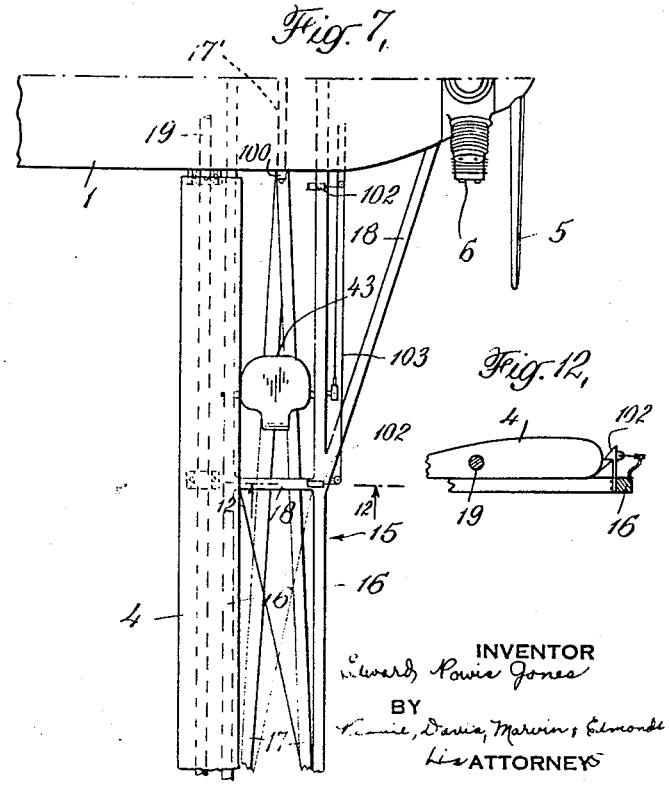

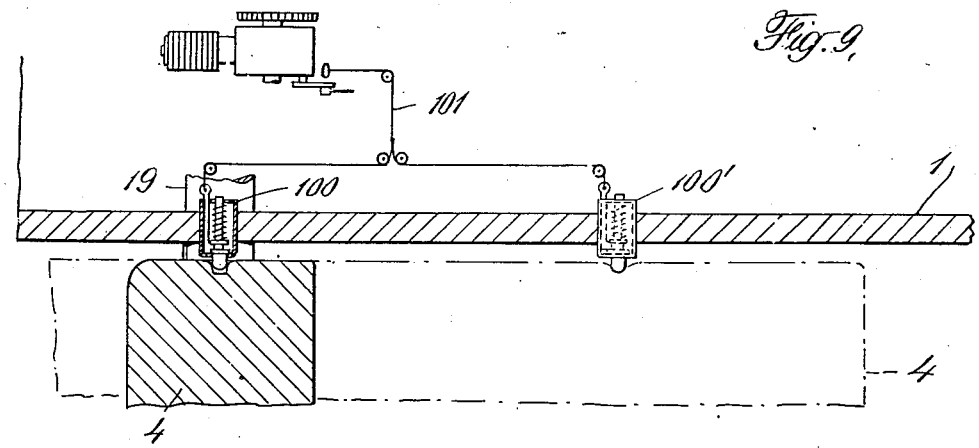
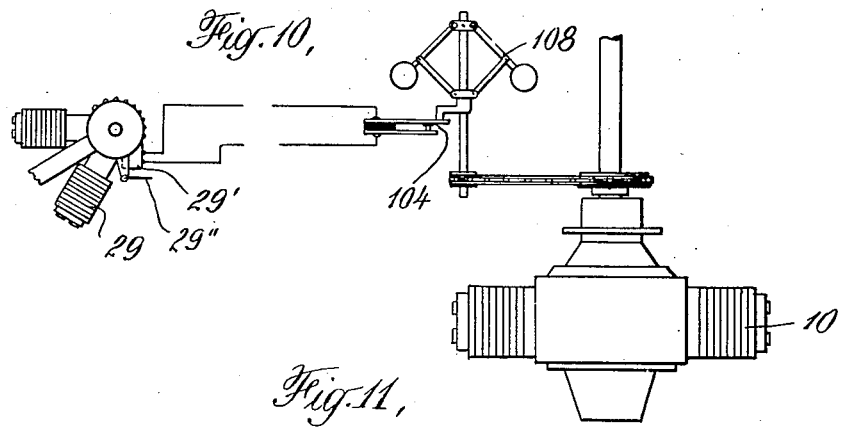
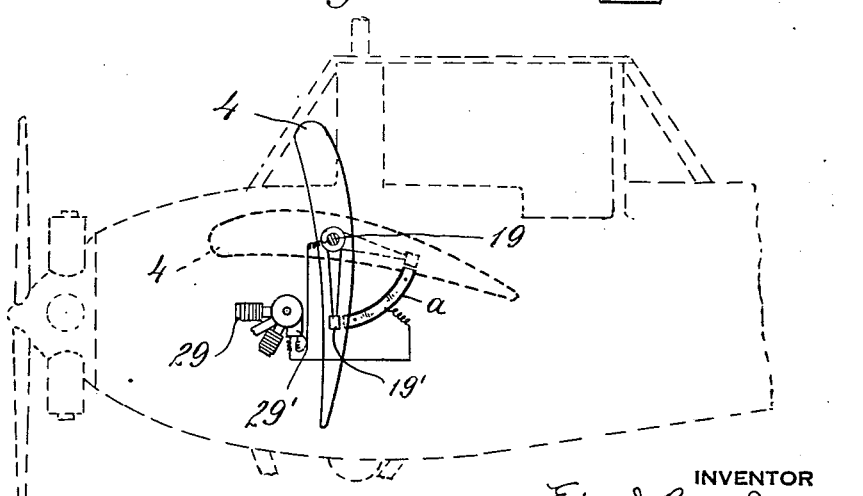

Patented June 3, 1930

1,761,444

UNITED STATES PATENT OFFICE

EDWARD POWIS JONES, OF NEW YORK, N. Y.

AIRCRAFT CONSTRUCTION

Application filed June 6, 1929. Serial No. 368,773.

This invention relates to aircraft, and is concerned with improvements in the structure of heavier-than-air aircraft to give them a wider range of maneuverability, and without sacrificing safety in operation or increasing the bulk of such craft appreciably.

It is the chief object of the invention to provide a heavier-than-air aircraft which will take-off and land either vertically or horizontally, as desired, and also fly over the ground substantially horizontally or maneuver substantially vertically up and down at will.

A further object of the invention is to provide an aircraft of this character which can be quickly converted, while in the air as well as on the ground, from a craft for ordinary horizontal flight to one for vertical flight or vice versa, without thereby upsetting the equilibrium of the craft.

Another object of the invention is to provide an aircraft for both vertical and horizontal flight in which the torque induced by the rotation of the vertical-lifting means, while the craft is ascending or descending, will be so controllable as to maintain vertical stability and control about the vertical aixs at all times.

Still another object of the invention is to provide a craft of this nature which will have lateral stability and control about the fore-and-aft axis, and be maintained on an even keel laterally during vertical maneuvering, and as well have horizontal stability and control about the transverse axis while rising and descending vertically, so that it may take-off, land and maneuver with its fuselage always parallel to the ground.

A particular object of the invention is to provide means for automatically re-establishing support or lift for the craft when acting as a helicopter and the helicopter engine fails, so that the craft will not be entirely dependent upon the helicopter engine for support while maneuvering vertically.

Other objects and their accomplishment will become apparent as the description progresses.

In order that the invention and its objects may be still better understood, an aircraft embodying the invention is shown in the accompanying drawings, but the inventive idea itself, however is limited in its embodiments only by the scope of the subjoined claims. In these drawings, Fig. 1 is a side view of the craft ready for ordinary horizontal take-off and flight;

Fig. 2 is a side view showing the craft ready for taking off or landing, and maneuvering, vertically;

Fig. 3 is a longitudinal central section, somewhat diagrammatic, of the craft;

Fig. 4 is a transverse section on line 4—4 of Fig. 3;

Fig. 5 is a detail elevation, partly in section, of the nose-end of the craft;

Fig. 6 is a detail of one of the elements of the invention;

Fig. 7 is a plan detail of another element of the invention;

Fig. 8 is a detail of a group of the elements shown in Fig. 3;

Fig. 9 is a detail of the fuselage construction in the region of the wings-attachment;

Fig. 10 is a detail of a group associated with the helicopter lifting-plant;

Fig. 11 is a detail of a group associated with the wings, and Fig. 12 is another detail of the wings.

Referring now by reference numerals to the constructions shown in the drawings, the craft comprises a fuselage 1, here shown as of the single-place, open cockpit type, the upper portion of the fuselage having its fairing flattened transversely and longitudinally, as shown in Figs. 1 and 2, and "bevelled off" transversely as shown in Fig. 4 to provide better observation facilities. The cockpit is open on all four top edges, and at each corner thereof, a fuselage post is mounted, and a top made for this framework by attaching thereto a flexible wire mesh guard 2', as shown in Fig 4, thus forming a cabin 2. The fuselage when completed hence resembles somewhat the ordinary cabin-type, except that here the cabin is open on all four top sides. In order to protect the pilot from being struck by the helicopter air screw, a wire mesh guard is mounted on the framework around the open cockpit as shown in Figs. 3 and 4. The cabin 2 has a hatch or half door 3 in one side and the wire guard is extended laterally beyond one side of the fuselage over the entrance.

The fuselage has the ordinary empennage at the tail end, consisting of rudder, elevators and horizontal and vertical stabilizers, all as well known. The main lift-surfaces, or wings, 4, are of the monoplane type, and have a wing curve appropriate to this type of aircraft. They are located on the fuselage in the proper position for best functioning with the fuselage of this type, and are provided at their trailing edges at or near the wing tips with the usual ailerons controlled from the pilot's seat. The fuselage supports an ordinary tractor airscrew 5 in the nose, the power for which is furnished by any suitable engine 6, to which the fuselage is properly stream-lined. The fuselage also has an ordinary undercarriage 7 in the proper place, and an ordinary tail skid 8.

Just forward of the pilot's cockpit 9, there is located a helicopter power unit, or lifting-plant, of any suitable type, and here shown as comprising a rotary engine 10, of any suitable design, supported on the bottom of the fuselage and separated from the cockpit by an insulated floor and a bulkhead 11. The helicopter engine drives a helicopter airscrew 14, of any suitable design, through a suitable shaft. The controls for the helicopter plant are located in the pilot's cockpit within easy reach, but out of the way. The nature of such plants being well known, this element of the invention will be passed without further remark except to state that it is so located, designed and operated with respect to the rest of the craft as to furnish a resultant lift of such magnitude as to cause the craft to ascend and descend substantially vertically upwards from a dead start without a run.

The main aerofoils comprise a right and a left wing panel made up in the usual manner of beams, ribs, and brace wires, and the two panels are connected together as a rigid unit and supported pivotally and rotatably in the fuselage by means of a rigid member or shaft 19, which passes from the wing tip of one panel transversely through the fuselage to the wing tip of the other panel, the shaft 19 being rigidly fixed to the wing panels intermediate and in addition to the regular wing beams or spars of each panel. This member thus forms a journal on which the rigid unit consisting of shaft and panels can be rotated as an integral in a vertical direction about a transverse axis when shaft 19 is properly mounted, as in the ball-bearings 20, formed in straps 21, at the six points 20' on the truss structures 15 on both sides of the fuselage, as shown in detail in Fig. 4. The straps containing the ball-bearings penetrate the wing structure, as shown, but are given the proper clearance therebetween.

The wing unit is supported laterally, that is transversely of the aircraft, by two trussed structures or braces 15, one on each side of the fuselage. These trusses are located longitudinally on the fuselage in such a place as to position the wings, when pivoted on them in the manner described, in the usual position for obtaining balance of the whole structure, proper location of the center of gravity of the craft, center of pressure of the wings, and the other factors which are dependent upon the correct location of the wings. Each truss-structure 15 comprises, preferably, a front horizontally extending beam 16, properly stream-lined, another beam 16 to the rear thereof and in a slightly lower plane to give the proper angle of incidence to the wing when resting horizontally on these beams, and struts 17 converging from the outer ends of the beams towards the fuselage and attached thereto as shown. A tension member 17' may be used to connect the struts across the fuselage. The beams 16 may also be extended across the fuselage. It is preferable also to employ a stay member 18 between the middle portion of the truss structure and the nose of the fuselage. The bays of the truss structure are suitably braced by bracing wires.

The wing-unit is operated and rotated on this truss structure by a small prime-mover 29 suitably mounted in the fuselage, and connected to the shaft 19 by a quadrant 23 and a suitable train of power-multiplying gears, here shown as comprising spur gears 24, 25, 26 and 27, all so arranged relatively to each other as to quickly transmit and multiply the power from the engine 29 to the shaft 19 to quickly turn the wing-unit from a horizontal to a vertical position or vice versa, as quickness is a prime requisite in case of failure of the helicopter engine while ascending or descending vertically. The engine 29 is of the type which may be operated both forward and reverse, and at higher or lower speeds. It is provided with a self starter 29', and a speed-and direction-control lever 29'' which is extended up into easy reach of the pilot. The engine 29 cuts off automatically upon the wing reaching its extreme vertical and horizontal positions, respectively, by means of an arrangement comprising the depending finger 19' on the shaft 19, which finger swings over and off the contact arc A in the respective directions entailed by the respective directions of rotation of the wing unit. The contact arc and the finger are the terminals of an electric circuit, through the self starter 29', and thus the circuit through the engine is opened when the wing reaches its extreme positions. When the wing is then in one of these extreme positions, the engine is started up to turn the wing-unit in the proper direction by shifting the lever 29'' to the proper position, and stepping on the self-starter pedal.

Thus the engine 29 satisfactorily rotates the wings as required for normal operating conditions. In an emergency, however, as when the engine 29 breaks down, the pilot must himself rotate the wing unit by hand, and to this end, there is provided, in the fuselage in juxtaposition with the pilot's seat, a cranking device 28, comprising a crank-shaft and having a spur-gear thereon for engaging gear 27. Power is applied by hand to the crank-shaft by a crank-handle not shown, normally stowed away somewhere in the cockpit. The pilot, by rotating the crank-shaft 28, can thus move the wings as a rigid unit from a substantially horizontal to a substantially vertical position. The crank-handle is, as stated, disengageable, and is used only in an emergency. In either case, whether operated by the engine 29 or by hand, the entire gear mechanism is enclosed in a suitable casing or guard.

Suitable lock-stops 100 and 100' are provided on the sides of the fuselage in juxtaposition with the inner edge-sections of the wing panels, these stops having spring pins arranged to register with sockets in the ends of the wings, as shown in Fig. 9, and the stops thus automatically engage with and lock the wings as they rotate over them to their extreme vertical and horizontal positions. These stops are unlocked to allow the wing position to be altered by simply pulling on the pull-wire 101, the handle for which wire is arranged in juxtaposition with the prime-mover 29. This pull-wire may, if desired, be arranged so as to automatically operate by the starting of the engine 29, to automatically unlock the wings. With wings of exceptionally high-lift qualities, or in case of unusually heavy wing-loading, the stops 100' alone may prove insufficient to maintain the wings always down at the exact angle of incidence while the craft is flying horizontally, and to take care of the additional forces engendered by these conditions, there may be provided auxiliary wing-locks 102, shown in Fig. 7 as arranged along the leading truss beam 16 at suitable points thereof. Any suitable type of lock may be employed for this purpose, and the preferred type is shown in detail in Fig. 12. These locks are released by a pull-wire 103 ending near the pilot's seat.

The aircraft may be taken off in either of two direction-planes which are substantially at right angles to each other; with the wings horizontal, in the usual manner of an ordinary airplane, by a horizontal accelerating run of a distance depending upon the thrust of the tractor airscrew and the lift-drift ratio of the wing; and, as when the space is too restricted for a "run", with the wings folded to a substantially vertical position, the tractor engine may be left dead, and vertical ascent then achieved by means of the thrust of the helicopter lifting-plant alone. The wings are made revoluble to a substantially vertical position, in order that when taking off or landing vertically, the head resistance of the wings will be decreased to such an extent that it will not be necessary to employ an unusual amount of power for the lift, and the vertical position of the wings will aid in vertical ascent or descent.

When the wings are rotated to the vertical position for or during vertical maneuvering, it is contemplated to employ a member 30 to maintain the balance around the transverse axis of the aircraft so that it will rise and descend vertically in an attitude substantially parallel to the ground. This feature of the invention also eliminates "pitching", and confers horizontal stability and control. The member 30 comprises a pair of more or less rigid rods 31 made considerably heavier at their ground ends 33 than at their fuselage ends, by any suitable means, here shown as a weight or ponderable member 31'. Each rod 31 preferably bears standard shock-absorbers 34 therein, and the two are joined together transversely of the aircraft and pivoted suitably between the lower longerons of the fuselage as shown at 32. The member 30 is thus revolubly around the pivot 32 forwardly and backwardly in the vertical plane. It is supported in its extreme front and rear positions by lock-stops 80 and 80' respectively. The member 30 is preferably swung by operating a suitable worm and wheel 35 at the upper end of the member 30, the worm being connected by suitable shaft 36 and bevel gears 37 and 38 to a crank handle 39 in the cockpit near the pilot's seat, so that he can readily operate it in flight. If found advisable, however, the shaft 36 may instead be suitably connected to the wing operating mechanism and may be operated automatically thereby. When preparing for vertical ascent, as the helicopter engine is started up and the craft rises, the main supporting wings are gradually folded upwardly. During this process, any shift of the fuselage from a horizontal position, due to a change in the center of gravity, or possibly the slip-stream from the helicopter airscrew striking the wings while in an oblique position, or to any other cause or condition, is counterbalanced by using the balancing device 30 as a stabilizer; that is, it is swung backwardly or forwardly, as the case may be. A forward swinging movement is used when folding the wings upwardly and a reverse movement of the crank and member 30 is, of course, employed when the wing is being lowered to horizontal for going into normal horizontal flight; in either case, chiefly for the purpose of counteracting the effects of the shift of the wing-mass.

The torque of the helicopter airscrew naturally tends to turn the nose of the airplane in a horizontal direction opposite to the direction of rotation of the helicopter airscrew, and to counteract this force and give control of yawing, it is contemplated to mount a suitable-sized airscrew 40 of the "pusher" type in a suitable aperture 41 in the fuselage as close to the rear end of the tail as feasible. This airscrew is motivated by a small prime mover 42 which may well be a "flivver" type internal combustion engine, or a storage-battery motor. When starting up the helicopter engine, the small engine is intended to be started up also, and the screw action of the pusher airscrew on the air, acting at the side of the tail, will tend to turn the tail of the plane about the vertical axis of the craft in a direction opposite to that in which the torque of the helicopter tends to turn the nose of the plane, thus neutralizing the torque of the helicopter. The small engine 42 can be regulated to run faster, slower, or in reverse, in conjunction with the speed of the helicopter propeller; that is, in such manner as it necessary to equalize the torque of the helicopter. The airscrew 40 may be operated separately, as shown, or the airscrew 40 may be connected directly, or by suitable step-up gearing, to the helicopter engine to be operated thereby instead of by a separate engine. When operating as an ordinary horizontal-flight airplane, the engine 42 and propeller 40 are used to quickly and positively bring the plane "into the wind" for the proper take-off, which can thus be made in a much more rapid and easy manner than by the usual jockeying of the ailerons, rudder, and elevators necessary in taking-off the ordinary airplane.

To secure lateral stabilization and control of "rolling" when the craft is maneuvering vertically, members 43 preferably small aerofoils, having a size and shape dependent upon the various balance characteristics of the particular individual craft concerned; and generally resembling wind-vanes are pivoted between the forward and rear beams of the truss structures 15 in such manner as to be rotatable in a vertical plane. These control planes 43 are located out on the truss structure at a suitable distance from the fuselage, and act in the air stream engendered by the helicopter. These control planes provide a vertical reaction around the fore-and-aft axis of the fuselage, and when the craft tends to roll around the longitudinal axis, they bring the fuselage back to an even keel. When the wing is folded up to a vertical position, these control planes occupy a substantially vertical position, and are manipulated from the pilot's seat to various positions approaching the horizontal to thereby neutralize the various rolling tendencies of the craft when lateral instability arises from "bumps," or from other causes. When the wing is rotated down to its substantially horizontal position, they are pressed by this rotation of the wing to lie flat against the underside of the wing, and hence, become inoperative.

It is apparent that when the craft is rising vertically by the lifting effect of the helicopter and the helicopter engine should fail, the pilot will naturally desire to start up the wing turning engine to shift the wings down into proper position for obtaining support by gliding, or to go into horizontal flight, and in so doing, the wing-lock is released as in the manner explained hereinabove, and the wing-engine used to turn the wings down to the proper angle of incidence. During the glide, the nose engine is started up, and when it is turning up properly, the ordinary airplane controls can be used to maintain normal horizontal flight. This involves some attention on the part of the pilot; accordingly, the wing turning engine is preferably started up automatically by the failure or stoppage of the helicopter engine, as by means of a ball-governor 108 mounted on a vertical shaft suitably supported in the fuselage, the lower end of the governor shaft bearing a sprocket wheel connected to another sprocket wheel on the helicopter shaft by means of an ordinary sprocket-chain. The sleeve of the governor is adapted to slide up and down on the shaft out of and into contact with a make-and-break contact 104, connected electrically to the starter 29' of the engine 29. Thus, when the helicopter shaft slows down or stops, the governor-sleeve slides down and closes the contact 104, thereby starting up engine 29. When the helicopter engine is operating normally, the contact is, of course, open and the engine 29 is hence inoperative.

It is contemplated that normally the craft will be taken off vertically, gain the desired altitude, then fly horizontally the desired distance, and then land vertically. Accordingly, in operating the craft, the tail of the craft is first elevated by unfolding the balancer down into a vertical position into contact with the ground, thereby bringing the fuselage up to a horizontal position, and the rotatable wings are then folded to a substantially vertical position and locked in that position. The helicopter lifting-plant is then started up, and simultaneously, the anti-torque propeller in the tail is started up, and its speed then regulated in accordance with the torque developed by increasing the speed of the helicopter to take off. The craft then ascends substantially vertically, or in the usual manner of helicopter aircraft, yawing and torque effects being counteracted by the anti-torque propeller, and the proper horizontal attitude being maintained by the balancing member, and an even keel being maintained by the wing flaps. When the desired altitude has been reached for going in normal horizontal flight, the wings are rotated down to a substantially horizontal position and locked in this position. During the process of wing-turning, any shift of the attitude of the craft from the horizontal, such as may be caused by the rotation of the wing, "bumps", and any other cause, is balanced as required merely by rotating the balancer crank handle in the proper direction.

Practically simultaneously with turning the main wing horizontal, the tractor engine in the nose is started up, the helicopter engine being allowed to turn over until the tractor engine builds up sufficiently, the helicopter is then shut off, together with the anti-torque propeller, and the blades of the helicopter airscrew are then brought fore-and-aft, to reduce head resistance, and are locked in this position by a suitable brake or lock on the helicopter propeller shaft, not shown. The craft then goes into horizontal flight like an ordinary airplane. When it is desired to land, this process is simply reversed to convert the "airplane" into a helicopter aircraft, if vertical landing is desired; or, if desired, the craft may be landed on a glide while in horizontal flight like an ordinary airplane.

Various refinements in the arrangement, and details of construction, of the various parts described for carrying out the present invention may obviously be made without departing from the scope of the invention; for example, the relative arrangements of the structure and parts of the interior of the plane may be so rearranged and proportioned as to convert it from the ordinary passenger-carrying type shown to a cargo carrying type.

I claim:

1. In an aircraft of the class described, a main aerofoil pivotally connected to the fuselage, trusses projecting laterally from the fuselage for supporting said aerofoil in a vertical position, and a small aerofoil member pivoted on each of said trusses and controllable from the pilot's seat so as to neutralize the rolling tendency of said aircraft during vertical ascent.

2. In an aircraft of the class described, a main aerofoil pivotally connected to the fuselage, trusses projecting laterally from each side of the fuselage for supporting said aerofoil in a vertical position, and a pair of small aerofoils members so supported and pivoted on said trusses as to neutralize the rolling tendency of said aircraft during vertical ascent and to assume a substantially horizontal position when said wings are folded in a horizontal position.

3. In an aircraft of the class described, a fuselage, a main aerofoil pivoted thereto and comprising wing panels on each side of the fuselage and formed into a rigid unit by a cross-beam, and a truss-structure extending laterally from the sides of the fuselage and separate from the wing unit, said truss-structure comprising a forward horizontal beam extending under and parallel to the wing from near one end of the wing unit through the fuselage to a point near the other end of the wing unit, a similar rear beam, a strut extending from each beam to the fuselage, and supports on the rear beam for the wing unit to turn on.

4. In an aircraft of the class described, a fuselage, a helicopter lifting plant, a wing unit rotatably from a vertical position for vertical maneuvering to a horizontal position for horizontal flight, a prime-mover for rotating said unit, and means for automatically starting said prime-mover to rotate said wing unit when the helicopter lifting plant breaks down.

5. In an aircraft of the class described, a fuselage, a helicopter airscrew and shaft mounted therein, an engine connected to said shaft to drive said airscrew, a sprocket-wheel on said shaft, a governor shaft mounted in said fuselage, a governor thereon having a slidable sleeve, a sprocket wheel on said governor shaft connected to said first sprocket wheel, an engine for turning the wing mounted in said fuselage and having a self-starter, said starter having an electric circuit including a make-and-break contact located below said sleeve in position to be operated by the sliding of said governor sleeve moving in conjunction with the rotation of said helicopter shaft.

6. In an aircraft of the class described, a fuselage, a helicopter lifting plant mounted therein to produce a substantially vertical lift and ascent of the craft, and a member operable from the pilot's seat and pivoted between the lower longerons of the fuselage near the tail thereof for maintaining the craft parallel to the ground on taking off and landing, comprising rods connected transversely of the fuselage near their ends, said connection comprising a massive resistant body, the rods having shock absorbing means between said body and the fuselage.

In testimony whereof I affix my signature.

EDWARD POWIS JONES.